United States Patent [19]
Littau

[11] Patent Number: 5,421,149
[45] Date of Patent: Jun. 6, 1995

[54] ECCENTRIC OSCILLATING SYSTEM

[76] Inventor: Eugene G. Littau, 8974 Shaw Square Rd., SE., Aumsville, Oreg. 97325

[21] Appl. No.: 316,918

[22] Filed: Oct. 3, 1994

[51] Int. Cl.⁶ .......................................... A01D 46/26
[52] U.S. Cl. ................................. 56/330; 56/328.1
[58] Field of Search ................... 56/12.5, 128, 328.1, 56/330, 340.1

[56] References Cited

U.S. PATENT DOCUMENTS

| | | | |
|---|---|---|---|
| 3,184,908 | 5/1965 | Rust | 56/330 |
| 4,982,558 | 1/1991 | Korthuis | 56/12.6 |
| 5,113,644 | 5/1992 | Windemuller et al. | 56/330 |
| 5,259,177 | 11/1993 | Windemuller et al. | 56/330 |

Primary Examiner—George A. Suchfield
Attorney, Agent, or Firm—Kolisch, Hartwell, Dickinson, McCormack & Heuser

[57] ABSTRACT

A harvesting machine with an upright, elongate, fingered shaker element. Shaker mounting structure including an upper support arm and a lower support arm rotatably mounts the shaker element. The support arms have vertically displaceable ends. A rotatable eccentric weight mechanism is operated to produce vertical oscillations in the shaker element accommodated by the displaceable ends of the support arms.

7 Claims, 2 Drawing Sheets

ECCENTRIC OSCILLATING SYSTEM

BACKGROUND AND SUMMARY OF THE INVENTION

This invention relates to a harvesting machine, and more particularly, to a harvesting machine which includes an elongate fingered shaker element disposed in a substantially upright position, with crop-engaging fingers projecting outwardly on the shaker element adapted to engage the crop being harvested. Such a harvesting machine is advantageously employed in harvesting fruits and berries through the shaking action imparted to the crop by the fingers described.

A general object of the invention is to provide an improved harvesting machine which includes an elongate, vertically disposed shaker element having outwardly projecting crop-engaging fingers, and a power-operated eccentric weight mechanism directly coupled to the shaker element to produce vertical oscillations in the shaker element relied upon to dislodge the fruit, berries, etc. being harvested.

The construction contemplated is a relatively simple one, and easy to maintain and operate. Oscillating frequency is easily adjustable, by adjusting the speed of rotation of the eccentric weight mechanism. Changing the weights involved in the mechanism is change effective to the magnitude of the oscillations produced.

Another object is to produce such a harvesting machine which features a vertically movable support supporting an end of the elongate shaker element, and a construction whereby spring biasing yieldably resists movement of the support from an at rest position for the support and the shaker element it mounts.

In a specific and preferred embodiment of the invention, the shaker element is rotatably supported at its ends for rotation about an upright axis. Rotation movement of the shaker element is produced by movement of the harvesting machine along the crop row, with the shaker element rotating as required to accommodate travel of the machine. The shaker element may be freely rotatable in its mounting, with rotation movement powered entirely by the movement of the crop. Vertical oscillations are imparted to the shaker element by the power-operated eccentric weight mechanism mounted at the upper end of the shaker element.

Yet another object is to provide a harvesting machine with a spring system for supporting the shaker element, with the shaker element oscillating vertically as yieldably resisted by the spring system, and which further includes a power-operated eccentric weight mechanism producing vertical oscillations in the shaker element.

BRIEF DESCRIPTION OF THE DRAWINGS

These and other objects and advantages are attained by the invention, which is described herein below in conjunction with the accompanying drawings, wherein.

DETAILED DESCRIPTION OF THE PREFERRED EMBODIMENT

Figure 1:
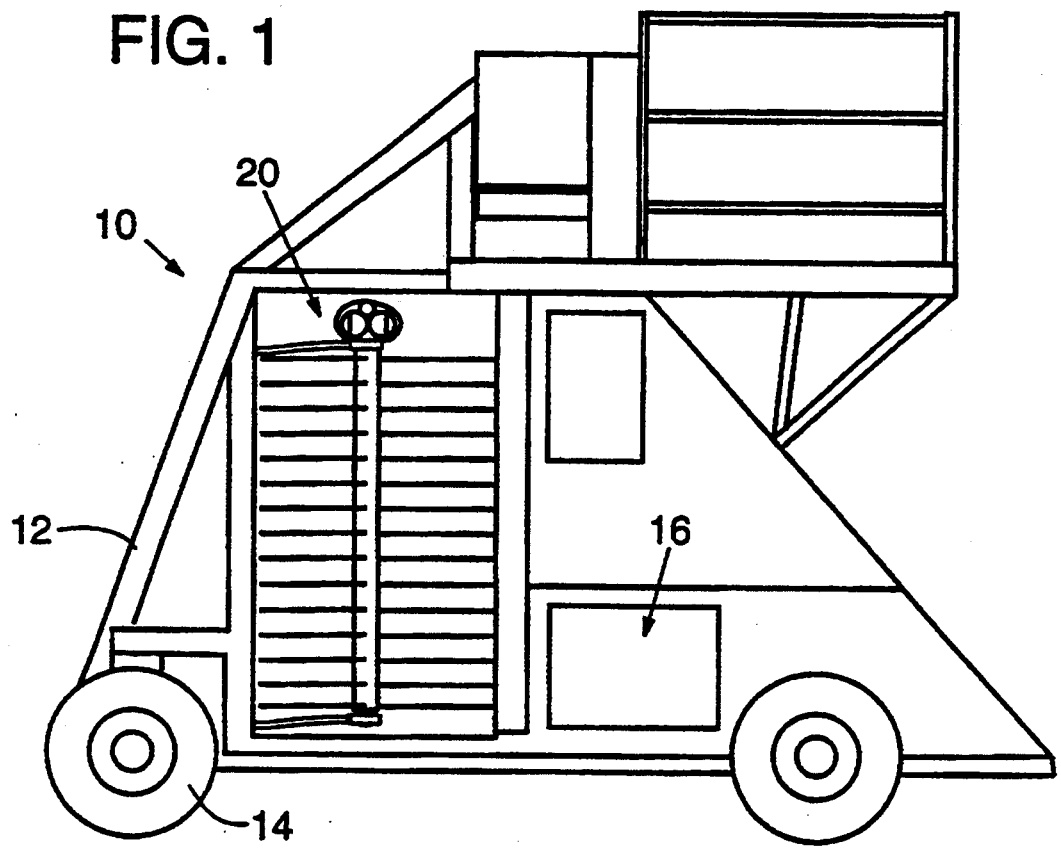
FIG. 1 is a side view, in simplified form, of a harvesting machine constructed pursuant to the invention.
Figure 3:
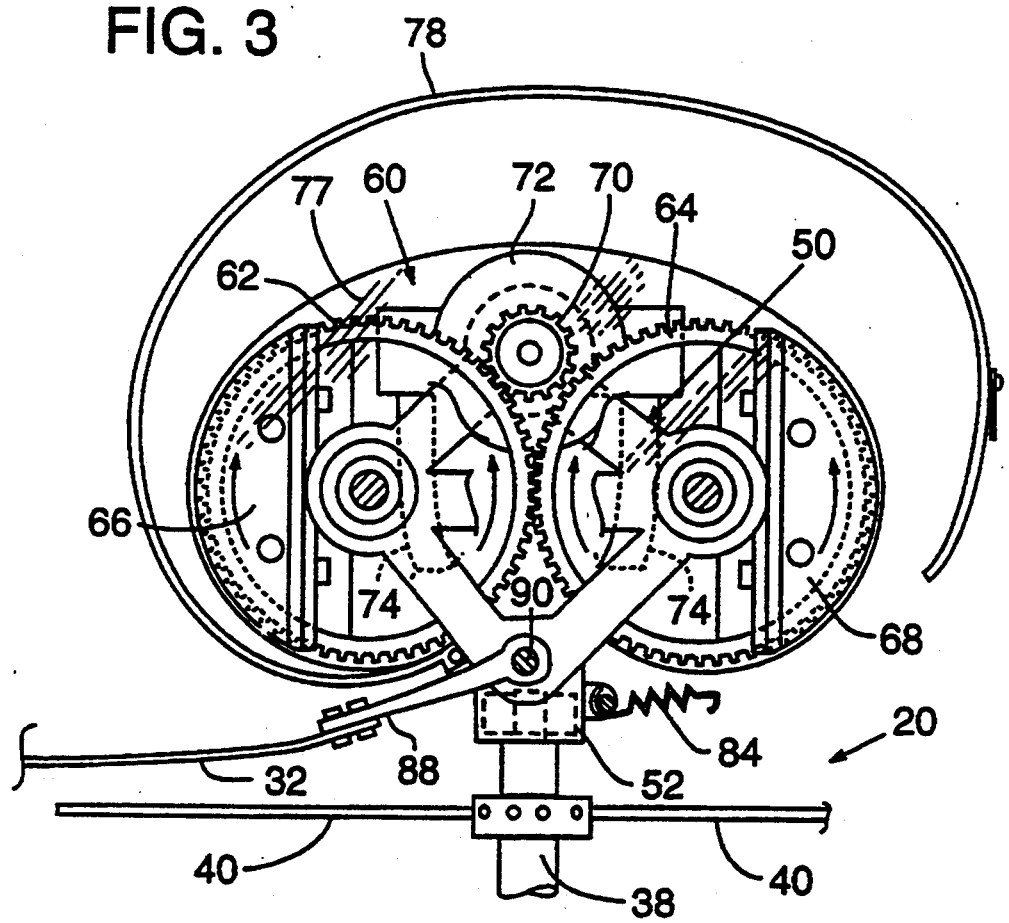
FIG. 3 resembles portions of FIG. 2, but showing a protective hood in the construction swung to an open position.

Referring now to the drawings, and first of all more particularly to FIG. 1, a harvesting machine generally indicated at 10 includes a ground traveling or vehicle frame 12 supported for travel movement over the ground by wheels, such as those shown at 14. A motor drive producing powered movement of the wheels and powering movement of the vehicle frame is indicated generally at 16.

Illustrated generally at 20 is an elongate, upright, fingered shaker element. The shaker element has upper and lower ends mounted on and supported by a shaker mounting structure 26, which in the particular form of the invention illustrated is a type of "C" frame, which includes an elongate upright 30 and horizontally extending arms 32 and 34 joined to and extending outwardly from the upright, with the arms straddling the shaker element which is disposed between the arms.

In a conventional vehicle, a pair of shaker elements of the type illustrated at 20 may be provided, each with a mounting structure as illustrated at 26 for supporting the element in the machine. The shaker elements occupy positions adjacent opposite lateral sides of the harvesting machine. With operation of the harvesting machine or harvester, the machine is driven along the crop row, with the two shaker elements on opposite sides of the crop being harvested. For simplicity reasons, only one of the shaker elements is described in detail.

Considering with more particularity shaker element 20, extending along the center of the element is an elongate upright hollow shaft 36. Distributed along the length of the shaft, and suitably secured to it, are what are referred to as collars 38. Each collar has socket structure for mounting the inner ends of a set of elongate, flexible, outwardly projecting fingers 40, which may be made of a suitable plastic material. The fingers, with operation of the harvester, project into the stalk or cane structure of the crop being harvested, and on being vertically oscillated, impart a shaking action to the crop which dislodges the fruit or berries being harvested. Such material then drops downwardly in the harvester to be collected on suitable collecting structure adjacent the ground, not described herein in detail, with particulars forming no part of the invention.

What is referred to herein as a subassembly frame is indicated at 50. This subassembly frame adjacent its base houses suitable axial and radial thrust bearing structure, in a region indicated at 52, rotatably mounting the upper end of shaft 36. The mounting provided accommodates free rotation of the shaft about a generally upright axis.

Also supported on the subassembly frame is what is referred to herein as a power-operated eccentric weight mechanism, given the general reference number 60.

Further describing this mechanism, rotatably supported opposite each other on the frame are a pair of gears 62, 64 which mutually engage. Each gear carries a weight, as exemplified by weight 66, 68, disposed in a position offset from the center of the gear, or in an eccentric position. The weights are suitably detachably mounted in their eccentric position on the gears.

Suitably supported by the subassembly frame above the gears 62, 64 is a pinion gear 70 with teeth engaging the teeth of gear 62. A variable speed motor, such as a suitable hydraulic motor 72, supplied with hydraulic fluid, has its casing suitably mounted on the subassembly frame, and the output shaft of this hydraulic motor mounts pinion gear 70.

It should be apparent that with operation of the hydraulic motor, gears 62, 64 are caused to rotate in opposite directions. With the weights occupying the position shown, the weights move with rotation of the gears to be placed in position first adjacent the bottom and then adjacent the top of the gears to produce a vertical oscillation movement in the power-operated eccentric weight mechanism.

The eccentric weight mechanism is covered by a protective housing structure 76. Housing structure 76 may include opposite transparent sides 77, and an upper hood 78. The hood curves in covering relation over the top of the gears. The hood section is pivoted at one end and at 80 to the subassembly frame. Its opposite end is detachably connected to the frame by a spring-biased hook 84 and a catch. Extending the spring disengages the hook from the catch, which frees the hood for upward swinging movement, thus to expose the eccentric weight mechanism.

Shaker mounting structure 26 has already been discussed. Arms 32, 34 in the structure may take the form of elongate spring elements with one set of ends suitably secured to upright 30, and an opposite side of remote ends which mount the shaker element 20. In the case of arm 32, its free end is connected by connector 88 to subassembly frame 50 through pivot connection 90. This pivot connection accommodates swinging of the subassembly frame relative to arm 32 about a horizontal axis.

The lower arm 34 is connected by connector 92 to self-aligning bearing structure 94 rotatably supporting the lower end of shaft 36.

Figure 2:
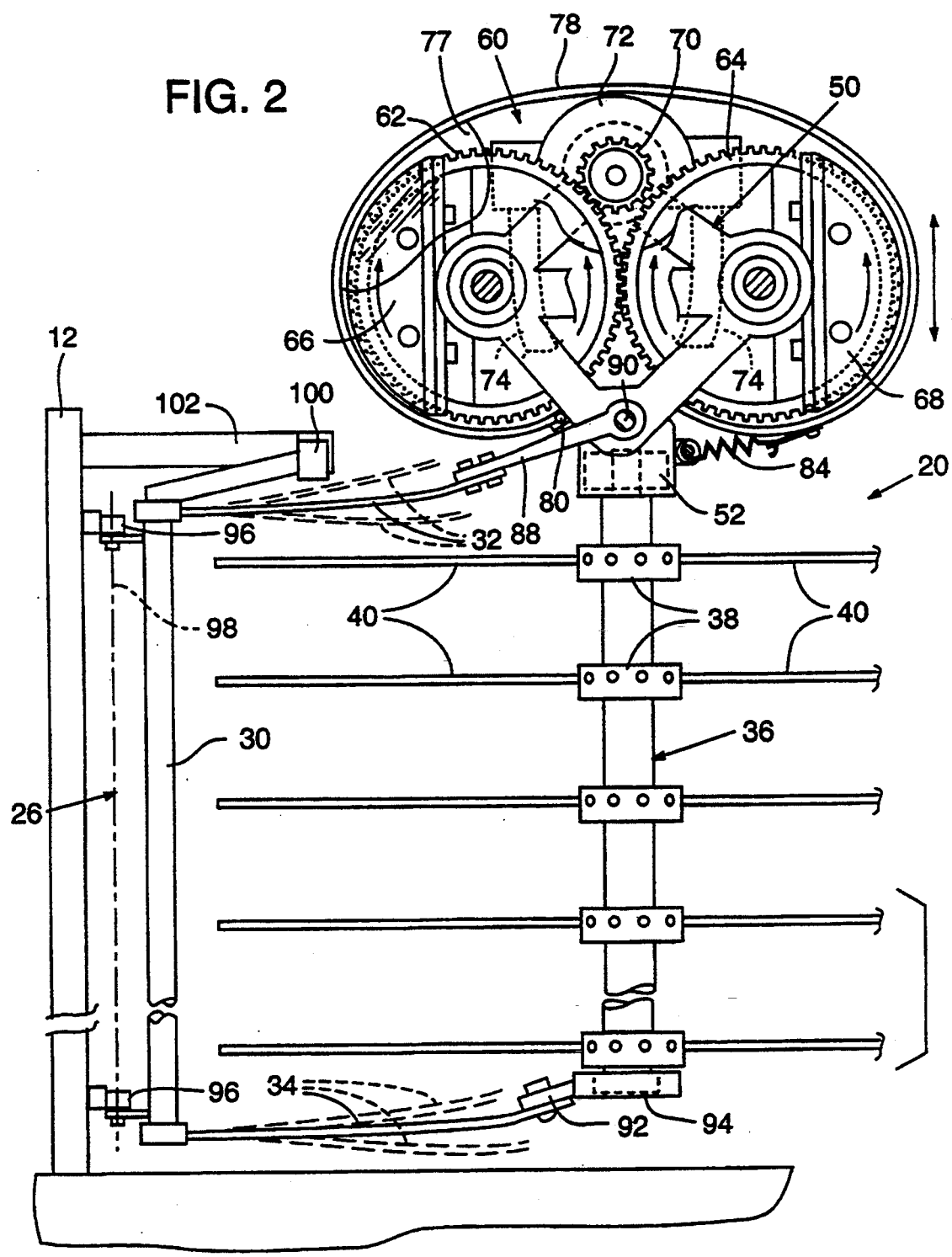
FIG. 2 is a side elevation, partially broken away, of a shaker element in the machine and illustrating its mounting on a shaker mounting structure.

In the structure described, the ends of arm 32, 34 remote from upright 30 are vertically movable or displaceable, both upwardly and downwardly, from the at rest position for these ends, which is the position shown in FIG. 2 in solid outline. This vertical displacement is resisted by the flexible and resilient nature of the spring elements which make up the arms. With operation of the eccentric mechanism 60, an up and down movement is imparted to the shaker element which is accommodated and yieldably resisted by the arms 32, 34.

Further describing the shaker mounting structure 26, upright 30 is supported on frame 12 of the vehicle by pivots 96 which provide for swinging movement of the mounting structure about an upright axis, indicated in FIG. 2 generally at 98. It should be understood that with movement of the vehicle along the crop row, a shaker element will swing laterally outwardly as is necessary to accommodate various widths in the crops being handled, with such swinging movement occurring about axis 98. A suitable biasing means is provided for yieldably resisting this laterally outward movement and returning the shaker element to an innermost position on the harvester. This position is defined by abutment 100 carried by the shaker mounting structure coming into contact with a stop carried by arm 102 which is part of the frame.

With the construction, the shaker element is vertically oscillated by the eccentric mechanism 60. These oscillations are imparted to shaft 36 and the collars which mount the inner extremities of the flexible fingers 40. The free ends of these fingers which are penetrating the crop also are subjected to up and down oscillatory movement. Because of the flexibility of the fingers, however, and with finger movement inhibited by engaging the crop, the movement of the free ends will not be as severe as the movement taking place in the inner ends of the fingers which are supported by the collars 38.

The harvesting vehicle described has a shaker system which is relatively simple and easily maintained. The fingers of the shaker element impart a pronounced shaking action operable to produce freeing of the fruit or berries being harvested. The shaking action, however, is not so aggressive as to lead to damage in the plant or stalk structure which supports the crop.

The frequency of the oscillations imparted to the crop by the shaker mechanism is changed by changing the speed of the motor driving the pinion gear. The magnitude of the oscillations may be adjusted by changing the mass of the weight 66, 68.

While a particular embodiment of the invention has been described, it should be obvious that various modifications are possible without departing from the invention.

It is claimed and desired to secure by Letters Patent:

1. A harvesting machine comprising:
   a ground-traveling frame,
   a shaker support mounted for limited vertical movement on said frame,
   an elongate fingered shaker element with crop-engaging fingers to engage the crop being harvested, and bearing structure supporting the shaker element on said support, and
   a rotatable eccentric weight mechanism born by the support operable on rotation of the weight mechanism to produce vertical oscillations imparted to the support and to the shaker element supported by the support.

2. The harvesting machine of claim 1, wherein the eccentric weight mechanism includes powered means born by the support actuatable to produce powered rotation of the eccentric weight mechanism.

3. The harvesting machine of claim 1, wherein the shaker support has an at rest position, and is vertically movable to a position displaced from said position at rest, and wherein the shaker support is spring biased toward said at rest position.

4. The harvesting machine of claim 1, wherein the shaker support includes an elongate spring element having an anchored end and an opposite remote end, and the bearing structure is disposed on said remote end of said spring element.

5. The shaker mechanism of claim 4, which further includes pivot means pivotally mounting the anchored end of said spring element for swinging movement of the spring element about an upright axis.

6. A harvesting machine comprising:
   a ground-traveling frame,
   an elongate upright shaker element having an upper end,
   a subassembly frame and bearing structure mounted on said subassembly frame rotatably supporting said upper end of the shaker element,
   a shaker support mounted for limited vertical movement,
   means pivotally mounting the subassembly frame on said shaker support accommodating relative pivotal movement about a substantially horizontal axis, and
   a power-operated eccentric weight mechanism supported by the subassembly frame operable on operation to produce vertical oscillations imparted to the subassembly frame.

7. A harvesting machine including a traveling frame, shaker-mounting structure supported by the frame including an elongate upper support member and an elongate lower support member, said members having an anchored set of ends interconnected whereby the members may swing together about an upright axis, said members having remote ends opposite said anchored ends which are vertically movable, an elongate upright shaker element extending between and supported by the remote ends of said support members, said shaker element moving vertically with vertical movement of said remote ends, and power-operated rotatable eccentric weight mechanism connected to the shaker element and vertically movable conjointly with the shaker element, said eccentric weight mechanism on operation vertically oscillating and imparting vertical oscillations to the remote ends of said support members and the shaker element which extends between and is supported by said remote ends.

* * * * *